United States Patent
Villien

(10) Patent No.: US 12,379,452 B2
(45) Date of Patent: Aug. 5, 2025

(54) METHOD FOR LOCATING A VEHICLE

(71) Applicant: Commissariat à l'Energie Atomique et aux Energies Alternatives, Paris (FR)

(72) Inventor: Christophe Villien, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 253 days.

(21) Appl. No.: 18/056,925

(22) Filed: Nov. 18, 2022

(65) Prior Publication Data

US 2023/0152417 A1 May 18, 2023

(30) Foreign Application Priority Data

Nov. 18, 2021 (FR) ..................... 21 12173

(51) Int. Cl.
 *G01S 5/02* (2010.01)
(52) U.S. Cl.
 CPC .............. *G01S 5/02585* (2020.05)
(58) Field of Classification Search
 CPC ...... G01S 5/0258–02585; G01S 5/0263–0264; G01S 19/45–49; G01S 13/765
 See application file for complete search history.

(56) References Cited

U.S. PATENT DOCUMENTS

2018/0007507 A1  1/2018  Ghabra et al.

FOREIGN PATENT DOCUMENTS

| CN | 109946730 A |   | 6/2019  |             |
|----|-------------|---|---------|-------------|
| CN | 112349143 A | * | 2/2021  | G01S 19/43  |

(Continued)

OTHER PUBLICATIONS

French Preliminary Search Report issued Jul. 1, 2022 in French Application 21 12173, filed on Nov. 18, 2021 (with English Translation of Categories of cited documents and Written Opinion), 12 pages.

(Continued)

*Primary Examiner* — Ladimir Magloire
*Assistant Examiner* — Fred H Mull
(74) *Attorney, Agent, or Firm* — Oblon, McClelland, Maier & Neustadt, L.L.P.

(57) ABSTRACT

A method includes: a) triggering, at an instant $tu_j$, an exchange of radio signals between a mobile transceiver fixed to the vehicle and a fixed transceiver; then b) computing a rough distance only from the transmission or reception instants of the exchanged radio signals; (c) constructing an estimated position of the vehicle at an instant $t_m$; (d) correcting the computed rough distance, then using this corrected rough distance to correct the estimated position. This correction comprises: computing an apparent velocity movement $v_{a0}$ of the vehicle towards the fixed transceiver; then adding a corrective term $\delta d_0$ to the computed rough distance, which corrective term is computed from the following relation: $\delta d_0 = v_{a0} \cdot DT0$, where DT0 is equal to the elapsed time between the instants $tu_j$ and $t_m$.

7 Claims, 3 Drawing Sheets

(56) References Cited

FOREIGN PATENT DOCUMENTS

| CN | 112839855 A | * | 5/2021 | ........ B60W 50/0097 |
| GB | 2551861 A | | 1/2018 | |
| JP | 2008109217 A | * | 5/2008 | |
| WO | WO 2020/063979 A1 | | 4/2020 | |

OTHER PUBLICATIONS

Navarro, M. et al. "Hybrid GNSS/INS/UWB Positioning for Live Demonstration Assisted Driving" 2019 IEEE Intelligent Transportation Systems Conference (ITSC) 8 pages.

Sidorenko, J. et al. "Error Corrections for Ultrawideband Ranging" IEEE Transactions on Instrumentation and Measurement, vol. 69, No. 11, Nov. 2020, 11 pages.

Zhu, B. et al., "An Integrated GNSS/UWB/DR/VMN Positioning Strategy for Intelligent Vehicles", IEEE Transactions on Vehicular Technology, 2020, 11 pages.

Di Pietra, V. et al., "Loosely Coupled GNSS and UWB with INS Integration for Indoor/Outdoor Pedestrian Navigation", Sensors 2020, 20, 6292, 22 pages.

Godha, S. "Performance Evaluation of Low Cost MEMS-Based IMU Integrated With GPS for Land Vehicle Navigation Application", 2006, Geomatics Engineering, UCGE Reports No. 20239, 230 pages.

* cited by examiner

METHOD FOR LOCATING A VEHICLE

The invention relates to a method and a system for locating a vehicle.

It is known, in addition to the measurements of an inertial measurement unit, for measurements to be used of the distance between a mobile transceiver fixed to the vehicle and a fixed transceiver located along the path of the vehicle. This improves the accuracy of locating the vehicle. Such a location method is described, for example, in the following articles:

V. Di Pietra et al.: "*Loosely Coupled GNSS and UWB with INS Integration for Indoor/Outdoor Pedestrian Navigation*", Sensors, 5 Nov. 2020; and Monica N. et al.: "*Hybrid GNSS/INS/UWB Positioning forLive Demonstration Assisted Driving*", 2019 IEEE Intelligent Transportation Systems Conference (ITSC), Auckland, NZ, Oct. 27-30, 2019;

Navarro Monica et al.: "*Hybrid GNSS/INS/UWB Positioning for Live Demonstration Assisted Driving*", 2019 IEEE Intelligent Transportation Systems Conference, 27 Oct. 2019, pg. 3294-3301.

More specifically, in these known methods, the location of the vehicle is corrected as a function of a difference between:
- a distance between the fixed and mobile transceivers measured from the transmission or reception instants of radio signals exchanged between the fixed and mobile transceivers; and
- an estimate of this distance that is constructed from the estimated position of the vehicle at an instant $t_m$ and from the known position of the fixed transceiver.

The prior art is also known from the following documents:

CN 112349143 A;

Sirorenko Juri et al.: "*Error corrections for Ultra-wide band ranging*", IEEE Transaction on instrumentation and measurement, vol. 69, No. 11, 21 May 2019, pg. 9037-9047;

CN 109946730 A;

GB 2551861 A;

WO 2020/063979 A1.

The invention aims to propose such a method for locating a vehicle, in which the location of the vehicle is more accurate.

Therefore, an aim of the invention is such a method for locating a vehicle.

A further aim of the invention is an information storage medium that comprises non-transitory instructions, executable by an electronic computer, for executing the aforementioned method for locating a vehicle.

Finally, the invention also relates to a system for locating a vehicle.

The invention will be better understood upon reading the following description, which is provided solely by way of a non-limiting example and with reference to the drawings, in which.

Throughout these figures, the same reference signs are used to denote the same elements.

Throughout the remainder of this description, the features and functions that are well known to a person skilled in the art are not described in detail. In particular, for the general knowledge of a person skilled in the art relating to systems for locating a vehicle using an inertial navigation unit, reference is made, for example, to the following thesis: S. Godha, "*Performance Evaluation of Low Cost MEMS-Based IMU Integrated With GPS for Land Vehicle Navigation Application*", PhD report, 2006. Hereafter, this thesis is referred to as "Godha2006".

In this description, a detailed example of an embodiment is first described in Chapter I with reference to the figures. Then, in the next chapter II, variants of this embodiment are presented. Finally, the advantages of the various embodiments are presented in chapter Ill.

CHAPTER I: EXAMPLE OF AN EMBODIMENT

Figure 1:
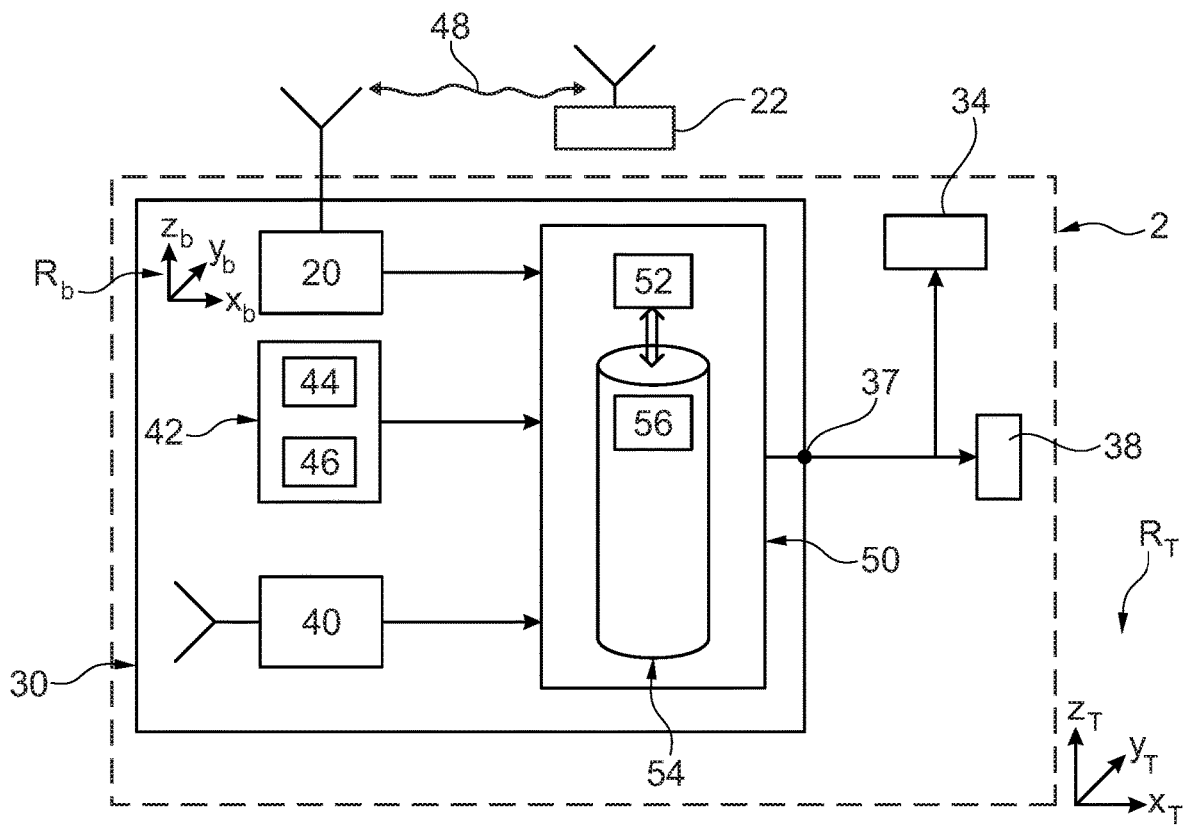
FIG. 1 is a schematic illustration of a system for locating a vehicle.

FIG. 1 shows a vehicle 2 capable of moving along a path. For example, in this example, the vehicle 2 is a motor vehicle travelling along a road. The vehicle 2 in this case is equipped with propulsion means 34, such as an engine that drives the wheels of the vehicle 2.

The vehicle 2 is equipped with a system 30 for locating this vehicle. This system 30 is capable of determining the position, the orientation and the velocity of the vehicle 2 in a terrestrial coordinate system $R_T$. In this case, the terrestrial coordinate system $R_T$ is fixed without any degree of freedom relative to the earth. The coordinate system $R_T$ comprises three axes, which are typically orthogonal to each other. For example, in this case, the coordinate system $R_T$ is the coordinate system known as the ECEF ("Earth Centred, Earth Fixed") coordinate system.

A movable coordinate system $R_b$ is also fixed without any degree of freedom relative to the vehicle 2. This coordinate system $R_b$ comprises three axes that are orthogonal to each other, denoted $x_b$, $y_b$ and $z_b$, respectively. Conventionally, when the vehicle 2 moves horizontally, the $x_b$ and $y_b$ axes are in a horizontal plane and the $z_b$ axis is vertical. In this case, the $x_b$ axis is oriented and pointed in the direction in which the vehicle is moving when it is moving forwards.

In this case, the position of the vehicle 2 in the coordinate system $R_T$ is expressed by coordinates of the origin of the coordinate system $R_b$ in the coordinate system $R_T$.

The orientation of the vehicle 2 is expressed by the yaw angle $\psi$, the pitch angle $\theta$ and the roll angle $\varphi$ of the coordinate system $R_b$ defined relative to a coordinate system called "navigation" coordinate system. In practice, the orientation of the vehicle is usually in the form of an orientation matrix, from which the yaw angle, the pitch angle and the roll angle of the vehicle can be derived. The orientation of the vehicle also can be in the form of a vector directly comprising the yaw angle, the pitch angle and the roll angle of the vehicle. Hereafter, these two cases are considered to be equivalent and therefore that the orientation of the vehicle comprises the yaw angle, the pitch angle and the roll angle of the vehicle as soon as these three angles can be directly derived from a matrix or a vector.

The position, the orientation and the velocity determined by the system 6 are delivered to an output 37. Hereafter, the position, the orientation and the velocity delivered to the output 37 by the system 30 for an instant $t_k$ are denoted P(k), O(k) and V(k), respectively.

Typically, the vehicle 2 comprises a cockpit 38 for guiding or assisting the guiding of the vehicle 2 to a predefined destination. The cockpit 38 is connected to the output 37. The cockpit 38 can be a manual and/or automatic cockpit. In the case of a manual cockpit, the determined position, orientation and velocity are transmitted to a human-machine interface to help a human being to steer the propulsion means 34. In the case of an automatic cockpit, the determined position, orientation and velocity are automatically converted into commands for driving the propulsion means 34, then are automatically transmitted to these propulsion means 34.

The system 30 comprises a satellite geolocation unit 40 and an inertial measurement unit 42.

The unit 40 is known using the acronym GNSS (Global Navigation Satellite System). Based on the satellite signals that it receives, the unit 40 generates signals representing the position and the velocity of the vehicle in the coordinate system $R_T$. The unit 40 updates its measurements at a frequency $F_{40}$. Conventionally, the frequency $F_{40}$ ranges between 0.1 Hz and 20 Hz.

The unit 42 is known using the acronym IMU ("Inertial Measurement Unit"). In particular, the unit 42 comprises a triaxial accelerometer 44 and a triaxial gyroscope 46. By virtue of these sensors, the unit 42 is capable of measuring the variation of the orientation, the position and the velocity of the vehicle 2. In this case, the measurement axes of the accelerometer 44 and the gyroscope 46 are coincident with the $x_b$, $y_b$ and $z_b$ axes of the coordinate system $R_b$, respectively. Furthermore, the accelerometer 44 is arranged such that a positive measurement of the acceleration of the vehicle 2 along the $x_b$ axis means that the vehicle 2 is accelerating while moving forward.

The unit 42 updates the acceleration and angular velocity measurements at a high frequency $F_{42}$. Conventionally, the frequency $F_{42}$ ranges between 20 Hz and 2,000 Hz. For example, in this case the frequency $F_{42}$ is equal to 200 Hz.

In order to accurately locate the vehicle 2 along its path, the system 30 also comprises a radio transceiver 20 on board this vehicle. One or more fixed transceiver(s) located along the path of the vehicle 2 is/are also provided. For example, the fixed transceivers are arranged at regular intervals along the path of the vehicle 2. FIG. 1 shows a single fixed transceiver 22.

The description provided hereafter in the particular case of this transceiver 22 similarly applies to all the other fixed transceivers disposed along the path of the vehicle 2.

The transceiver 22 is stationary and its position in the terrestrial coordinate system $R_T$ is known in advance and does not change. When the vehicle 2 is located on a segment of its path in the vicinity of the transceiver 22, irrespective of the position of the vehicle 2 on this segment, the transceivers 20, 22 are capable of exchanging frames of information with each other, allowing the distance separating them to be measured.

The transceiver 20 exchanges frames of information with the transceiver 22 by means of a wireless radio link 48. These frames of information are particularly exchanged in order to measure the distance that separates these transceivers 20, 22 based on the flight times of these frames of information. To this end, in this case the transceivers 20, 22 are Ultra-Wide Band (UWB) transceivers. The term "ultra-wide band transceiver" or "UWB transceiver" in this case denotes a transceiver that uses a wide frequency band to send and receive the frames of information. A "wide" frequency band is a frequency band with a width that is greater than $0.2\ f_c$, where $f_c$ is the median frequency of this frequency band. Typically, a wide frequency band is greater than 250 MHz or even greater than 400 MHz.

Each measurement of a distance between the transceivers 20, 22 requires exchanging several frames of information between these transceivers 20, 22 and measuring the transmission and reception instants of these frames of information. This exchange of frames of information is repeated at a frequency $F_{20}$ in order to update the distance measurement at this frequency. The frequency $F_{20}$ is smaller than the frequency $F_{42}$. Typically, the frequency $F_{20}$ is ten or fifty times smaller than the frequency $F_{42}$. Conventionally, the frequency $F_{20}$ ranges between 0.1 Hz and 20 Hz. In this case, the transmission and reception instants of the frames of information are obtained by the transceiver 20 housed in the vehicle 2.

In order to determine the position, the orientation and the velocity of the vehicle 2 from the measurements of the units 40 and 42 and the transmission and reception instants obtained by the transceiver 20, the system 30 comprises a programmable electronic computer 50. This computer 50 is capable of acquiring the measurements of the units 40 and 42 and the transmission and reception instants obtained by the transceiver 20. Then, from these measurements, the computer 50 determines the position, the orientation and the velocity of the vehicle 2 in the coordinate system $R_T$. The computer 50 comprises a microprocessor 52 and a memory 54 comprising the instructions and the data needed to implement the method described with reference to FIG. 3.

More specifically, the memory 54 comprises the instructions of a software module 56 capable of determining the position, the orientation and the velocity of the vehicle 2 from the measurements acquired when it is executed by the microprocessor 52. In this case, the module 56 particularly implements a merge algorithm that establishes a new estimate of the position, the orientation and the velocity of the vehicle 2 from a previous estimate of the position, the orientation and the velocity of the vehicle 2 and from new measurements acquired since this previous estimate. Typically, the merge algorithm also establishes margins of error on each new estimate.

The general principles of merge algorithms are well known to a person skilled in the art. For example, an interested reader can once again refer to the aforementioned Godha2006 thesis. Typically, this merge algorithm implements one or more Kalman filter(s). In this case, the module 56 implements an architecture known as a "closed loop integration scheme" or "closed loop approach".

Figure 2:
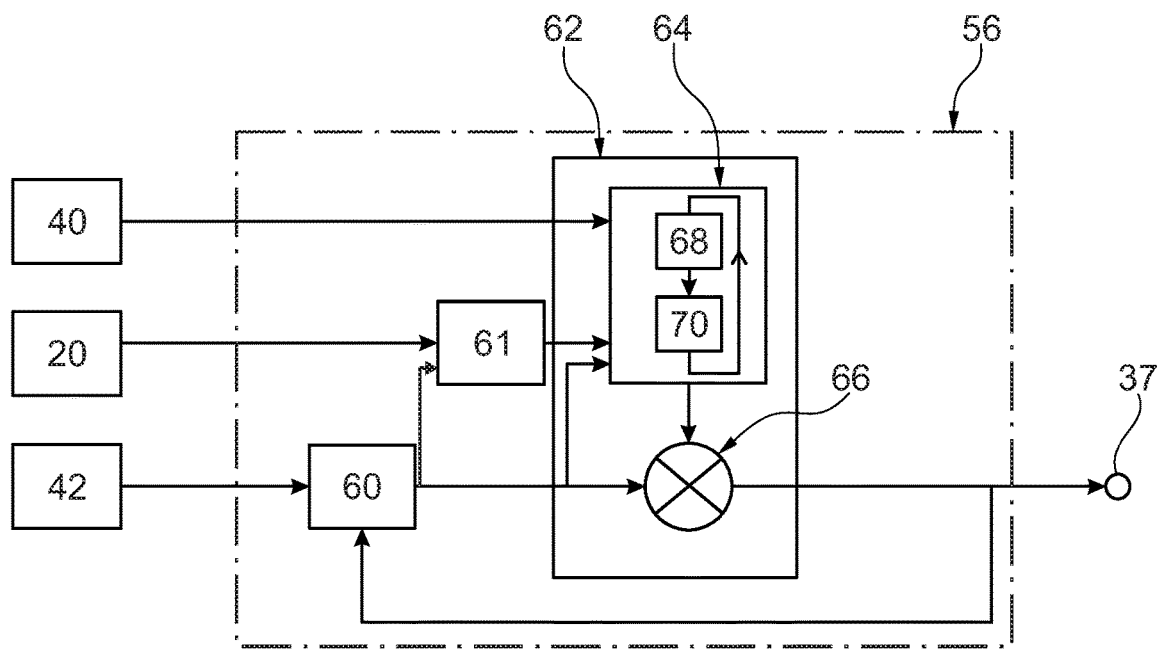
FIG. 2 is a schematic illustration of various software modules implemented in the system of FIG. 1.

FIG. 2 shows the architecture of the module 56 in more detail. The module 56 comprises:
- a sub-module 60 for integrating an inertial measurement;
- a sub-module 61 for computing a corrected distance between the transceivers 20, 22 from the transmission and reception instants obtained by the transceiver 20; and
- a correction sub-module 62.

The general operating principles of the sub-modules 60 and 62 are known. For example, for a detailed description of these general principles, the reader can consult Chapter 4 of the Godha2006 thesis. Thus, hereafter, only the details specific to the invention are described in detail.

The sub-module 60 is known as "Mechanization". For each instant $t_k$, the sub-module 60 constructs a rough estimate of a position $P_e(k)$, an orientation $O_e(k)$ and a velocity $V_e(k)$ of the vehicle 2. Throughout this document, the "k" symbol is the sequence number of the instant $t_k$ in the temporally ordered sequence $\{0, t_1, t_2, \ldots, t_{k-1}, t_k, \ldots\}$ of the instants $t_k$. Let k−1 be the sequence number of the instant $t_{k-1}$ immediately preceding the instant $t_k$. The position $P_e(k)$, the orientation $O_e(k)$ and the velocity $V_e(k)$ of the vehicle 2 are each a vector comprising three coordinates. The coordinates of the position $P_e(k)$ in the coordinate system $R_T$ are denoted $x_e(k)$, $y_e(k)$ and $z_e(k)$. The coordinates of the orientation $O_e(k)$ are denoted $\psi_e(k)$, $\theta_e(k)$ and $\varphi_e(k)$ and the coordinates of the velocity $V_e(k)$ are denoted $Vx_e(k)$, $Vy_e(k)$ and $Vz_e(k)$.

The frequency of the instants $t_k$ is less than or equal to the frequency $F_{42}$. In this case, the frequency of the instants $t_k$ is equal to the frequency $F_{42}$.

The sub-module 60 constructs the position $P_e(k)$, the orientation $O_e(k)$ and the velocity $V_e(k)$ from:
- the previous position $P(k-1)$, the previous orientation $O(k-1)$ and the previous velocity $V(k-1)$ determined for the vehicle 2 at the instant $t_{k-1}$ by the system 30 and delivered to the output 37; and
- the measurements of the accelerometer 44 and of the gyroscope 46 acquired by the sub-module 60 at the instant $t_k$.

The combination of the sub-module 60 and of the unit 42 forms an Inertial Navigation System, which is known using the acronym INS.

The sub-module 61 acquires the transmission and reception instants obtained by the transceiver 20 and the last position of the vehicle 2 estimated by the sub-module 60. Then, the sub-module 61 delivers a corrected distance to the sub-module 62 that is computed from the acquired transmission and reception instants and from the last acquired position of the vehicle 2. The detailed operation of this sub-module 61 is described with reference to FIG. 3.

At particular instants $t_k$, the sub-module 62 corrects the position $P_e(k)$, the orientation $O_e(k)$ and the velocity $V_e(k)$ constructed by the sub-module 60 for this instant $t_k$ in order to obtain a corrected position $P_c(k)$, a corrected orientation $O_c(k)$ and a corrected velocity $V_c(k)$ for this instant $t_k$. Hereafter, these particular instants $t_k$ are called "instants $t_m$". The "m" symbol is equal to the sequence number of a particular instant $t_k$ in the sequence $\{0, t_1, t_2, \ldots, t_{k-1}, t_k, \ldots\}$. Each sequence number m is therefore equal to a respective sequence number k. Thus, the position $P_e(m)$, the orientation $O_e(m)$ and the velocity $V_e(m)$ are equal to the position $P_e(k)$, the orientation $O_e(k)$ and the velocity $V_e(k)$, respectively, constructed for the instant $t_k$ equal to the instant $t_m$. The sequence $\{0, t_1, t_2, \ldots, t_{m-1}, t_m, \ldots\}$ of the instants $t_m$ is a sub-set of the sequence $\{0, t_1, t_2, \ldots, t_{k-1}, t_k, \ldots\}$. Thus, the correction by the sub-module 62 is not carried out for each instant $t_k$ but only for some of them. At each instant $t_m$, the sub-module 62 combines the position $P_e(m)$, the orientation $O_e(m)$ and the velocity $V_e(m)$ with respective correction coefficients in order to obtain the corrected position $P_c(m)$, the corrected orientation $O_c(m)$ and the corrected velocity $V_c(m)$. At the instants $t_m$, the corrected position $P_c(m)$, the corrected orientation $O_c(m)$ and the corrected velocity $V_c(m)$ are delivered to the output 37 and not the position $P_e(m)$, the orientation $O_e(m)$ and the velocity $V_e(m)$. The correction coefficients are updated as a function of the measurements of the unit 40 and of the corrected distance determined by the sub-module 61. The correction coefficients are therefore updated at a frequency that is less than the frequency $F_{42}$.

The sub-module 62 acquires the measurements of the unit 40 at a frequency that is less than or equal to the frequency $F_{42}$. In this case, the acquisition frequency of the measurements of the unit 40 is equal to the frequency $F_{40}$. Hereafter, $tg_i$ denotes the acquisition instants of a new measurement of the unit 40. These instants $tg_i$ form a temporally ordered sequence $\{0, tg_1, tg_2, \ldots, tg_{i-1}, tg_i, \ldots\}$ of instants $tg_i$. The "i" symbol denotes the sequence number of the instant $tg_i$ in this sequence. The sub-module 62 updates the correction coefficients each time a new measurement of the unit 40 is acquired and therefore for each instant $tg_i$. The instants $tg_i$ are less frequent than the instants $t_k$.

The sub-module 62 also acquires the corrected distance, delivered by the sub-module 61, at a frequency that is less than or equal to the frequency $F_{42}$. In this case, the acquisition frequency of the corrected distance is equal to the frequency $F_{20}$. Hereafter, $to_j$ denotes the acquisition instants of each new corrected distance. Also, $dc_j$ denotes the corrected distance acquired at the instant $to_j$. The "j" symbol is the sequence number of the instant $to_j$ in the temporally ordered sequence $\{0, to_1, to_2, \ldots, to_{j-1}, to_j, \ldots\}$ of the instants $to_j$. The sub-module 62 also updates the correction coefficients each time a new corrected distance dc is acquired and therefore for each instant $to_j$. Since the frequency $F_{20}$ is lower than the frequency $F_{42}$, several instants $t_k$ systematically exist between the instants $to_{j-1}$ and $to_j$.

Hereafter, the sequences $\{0, tg_1, tg_2, \ldots, tg_{i-1}, tg_i, \ldots\}$ and $\{0, to_1, to_2, \ldots, to_{j-1}, to_j, \ldots\}$ are both considered to be sub-sets of the sequence $\{0, t_1, t_2, \ldots, t_{k-1}, t_k, \ldots\}$. Thus, each instant $tg_i$ and $to_j$ corresponds to a respective instant $t_k$ of the sequence $\{0, t_1, t_2, \ldots, t_{k-1}, t_k, \ldots\}$. Furthermore, in this embodiment, the instants $tg_i$ and $to_j$ are separate. In other words, at an instant $tg_i$ where the measurement of the unit 40 is acquired, no new corrected distance is acquired, and vice versa. Finally, throughout this document, the instants $t_m$ are equal to the instants at which the sub-module 62 acquires either a measurement of the unit 40 or a new corrected distance.

In order to update the correction coefficients as a function of the measurements of the unit 40 and of the corrected distance, the sub-module 62 comprises a Kalman filter 64. In order to combine the correction coefficients with the rough estimates delivered by the sub-module 60, the sub-module 62 also comprises an adder 66.

Herein, the filter 64 is known using the acronym ESKF (Error State Kalman Filter) since it estimates corrections to be made to the position, the orientation and the velocity estimated by the sub-module 60. More specifically, the filter 64 provides a state vector $X_{m|m}$ for each instant $t_m$. In particular, the state vector $X_{m|m}$ contains the correction coefficients to be used to correct the position $P_e(m)$, the orientation $O_e(m)$ and the velocity $V_e(m)$. For each instant $t_m$, the adder 66 combines the correction coefficients provided by the filter 64 with the position $P_e(m)$, the orientation $O_e(m)$ and the velocity $V_e(m)$ in order to obtain the corrected position $P_c(m)$, the corrected orientation $O_c(m)$ and the corrected velocity $V_c(m)$. For each instant $t_k$ after the instant $t_m$ and before the instant $t_m+1$, no correction is made to the estimates constructed by the sub-module 60.

For example, in this case, the state vector $X_{m|m}$ contains correction coefficients $\delta_x(m)$, $\delta_y(m)$ and $\delta_z(m)$ of the coordinates $x_e(m)$, $y_e(m)$ and $z_e(m)$, respectively, of the position $P_e(m)$. The adder 66 adds these coefficients $\delta x(m)$, $\delta y(m)$ and $\delta z(m)$, respectively, to the coordinates $x_e(m)$, $y_e(m)$ and $z_e(m)$ in order to obtain the coordinates $x_c(m)$, $y_c(m)$ and $z_c(m)$, respectively, of the corrected position $P_c(m)$.

The state vector $X_{m|m}$ also comprises correction coefficients $\delta_\psi(m)$, $\delta_\theta(m)$ and $\delta_\varphi(m)$ of the coordinates $\psi_e(m)$, $\theta_e(m)$ and $\varphi_e(m)$, respectively, of the orientation $O_e(m)$. The adder 66 adds these coefficients $\delta_\psi(m)$, $\delta_\theta(m)$ and $\delta_\varphi(m)$, respectively, to the coordinates $\psi_e(m)$, $\theta_e(m)$ and $\varphi_e(m)$ in order to obtain the corrected coordinates $\psi_c(m)$, $\theta_c(m)$ and $\varphi_c(m)$, respectively, of the orientation $O_c(m)$.

Similarly, the state vector $X_{m|m}$ also comprises three correction coefficients $\delta v_x(m)$, $\delta v_y(m)$ and $\delta v_z(m)$ used to respectively correct the coordinates $Vx_e(m)$, $Vy_e(m)$ and $Vz_e(m)$ of the velocity $V_e(m)$.

Conventionally, the state vector $X_{m|m}$ also comprises correction coefficients for correcting other parameters, such as measurement biases of the accelerometer 44 and of the gyroscope 46 or the like. In this embodiment, the state vector $X_{m|m}$ also contains:

three correction coefficients $\delta ba_x(m)$, $\delta ba_y(m)$ and $\delta ba_z(m)$ for correcting the measurement biases of the accelerometer 44 in directions $x_b$, $y_b$ and $z_b$, respectively;

three correction coefficients $\delta bg_x(m)$, $\delta bg_y(m)$ and $\delta bg_z(m)$ for correcting the measurement biases of the gyroscope 46 around the axes parallel to the $x_b$, $y_b$ and $z_b$, respectively.

In this embodiment, the state vector $X_{m|m}$ is therefore the following vector with fifteen coordinates: $[\delta_\psi(m), \delta_\theta(m), \delta_\varphi(m), \delta v_x(m), \delta v_y(m), \delta v_z(m), \delta_x(m), \delta_y(m), \delta_z(m), \delta ba_x(m), \delta ba_y(m), \delta ba_z(m), \delta bg_x(m), \delta bg_y(m), \delta bg_z(m)]^T$, where the "$T$" symbol is the symbol of the transposed operation.

The filter 64 is a recursive algorithm, which, for each instant $t_m$, provides the adder 66 with a new state vector $X_{m|m}$ computed from:
the previous state vector $X_{m-1|m-1}$;
the measurement of the unit 40 or of the new corrected distance acquired at the instant $t_m$; and
the position $P_e(m)$, the orientation $O_e(m)$ and the velocity $V_e(m)$ constructed by the sub-module 60 for the instant $t_m$.

Conventionally, the filter 64 comprises a prediction block 68 computing a first state vector $X_{m|m-1}$ from the vector $X_{m-1|m-1}$, followed by an update block 70 computing the vector $X_{m|m}$ from the predicted vector $X_{m|m-1}$. These blocks are executed one after the other for each vector $X_{m|m}$.

More specifically, the block 68 constructs a prediction $X_{m|m-1}$ of the state vector from the previous state vector $X_{m-1|m-1}$.

In this case, an embodiment of the blocks 68 and 70 is described in the particular case where the filter 64 is an Extended Kalman Filter (EKF).

The propagation or state prediction equation of the filter 64 implemented by the block 68 is defined by the following relation (1):

$$X_{m|m-1} = A_{m-1} X_{m-1|m-1},$$

where:
$X_{m-1|m-1}$ is the estimate of the state vector at the instant $t_{m-1}$ obtained by taking into account all the measurements up to the instant $t_{m-1}$;
$X_{m|m-1}$ is the prediction of the state vector at the instant $t_m$ obtained by taking into account all the measurements up to the instant $t_{m-1}$ and without taking into account the measurements acquired at the instant $t_m$;
$A_{m-1}$ is the state transition matrix at the instant $t_{m-1}$.

In the particular case described herein whereby the filter 64 is an Error State Kalman Filter, the vector $X_{m-1|m-1}$ is always zero since it is assumed that the error was corrected beforehand. In other words, relation (1) is reduced to the following relation:

$$X_{m|m-1} = 0.$$

The propagation or prediction equation of the error covariance matrix implemented by the block 68 is defined by the following relation (2):

$$P_{m|m-1} = A_{m-1} P_{m-1|m-1} A_{m-1}^T + Q_{m-1},$$

where:
$P_{m-1|m-1}$ is the estimate of the covariance matrix of the error at the instant $t_{m-1}$ obtained by taking into account all the measurements acquired up to the instant $t_{m-1}$ $P_{m|m-1}$ is the prediction of the covariance matrix $P_m$ at the instant $t_m$ obtained by only taking into account the measurements acquired up to the instant $t_{m-1}$;
$Q_{m-1}$ is the covariance matrix of the process noise v.

Block 70 corrects the prediction $X_{m|m-1}$ of the state vector in order to obtain the state vector $X_{m|m}$. The corrected vector $X_{m|m}$ is constructed as a function of a difference $Y_m$ between:
an estimate $\hat{z}_m$ of a physical quantity at the instant $t_m$; and
the measurement $z_m$ of this same physical quantity at the instant $t_m$.

The difference $Y_m$ is known as "innovation". In this case, the measured physical quantities are the position and the velocity measured by the unit 40 and, alternately, the corrected distance delivered by the sub-module 61. Thus, for each instant $tg_i$, the block 70 corrects the prediction $X_{m|m-1}$ solely from the measurement of the unit 40 acquired at this instant $tg_i$. Conversely, for each instant $to_1$, the block 70 corrects the prediction $X_{m|m-1}$ solely from the corrected distance acquired at this instant $to_1$. The correction of the prediction $X_{m|m-1}$, at the instants $tg_i$, as a function of the differences in position and in velocity, is carried out, for example, as described in Godha2006. Thus, this functionality of the block 70 is not described in further detail. Only the correction of the prediction $X_{m|m-1}$, at the instants $to_1$, as a function of the corrected distance, is described hereafter.

In this embodiment, the physical quantity is the corrected distance $dc_m$. The estimate $\hat{z}_m$ of the corrected distance $dc_m$ is constructed using the following relation (3):

$$\hat{z}_m = \sqrt{(x_e(m) - B_x)^2 + (y_e(m) - B_y)^2 + (z_e(m) - B_z)^2}$$

where:
m is the sequence number of an instant $t_m$ of the sequence $\{0, t_1, t_2, \ldots, t_{m-1}, t_m, \ldots\}$ where a new corrected distance is acquired;
$x_e(m)$, $y_e(m)$ and $z_e(m)$ are the coordinates of the position $P_e(m)$ estimated by the sub-module 60 and expressed in the coordinate system $R_T$;
$B_x$, $B_y$, $B_z$ are the coordinates of the position of the transceiver 22 in the coordinate system $R_T$.

The coordinates $B_x$, $B_y$, $B_z$ are constant and are pre-stored in the memory 54.

The innovation $Y_m$ is obtained using the following relation (4): $Y_m = dc_m - \hat{z}_m$.

Typically, the block 70 corrects the prediction $X_{m|m-1}$ by adding the innovation $Y_m$ multiplied by the Kalman gain $K_m$. The gain $K_m$ is computed using the following relation (5):

$$K_m = P_{m|m-1} H_m^T (H_m P_{m|m-1} H_m^T + R_m)^{-1}, \text{ where:}$$

the matrix $R_m$ is the covariance matrix of the noise over the corrected distance; and
$H_m$ is an observation matrix.

The observation matrix $H_m$ is a function of the partial drift of the relation (3) relative to the various parameters of the state vector $X_{m|m}$. The matrix $R_m$ is, for example, constant and is initialised using data relating to the covariance of the noise on the measurements of the transmission and reception instants obtained by the transceiver 20.

Then, the state vector $X_{m|m}$ is obtained using the following relation (6): $X_{m|m} = X_{m|m-1} + K_m Y_m$.

The updated covariance matrix of the error at the instant $t_m$ is computed using the following relation (7): $P_{m|m} = (I - K_m H_m) P_{m|m-1}$, where I is the identity matrix.

The matrix $P_{m|m}$ contains the margins of error on the estimates of the correction coefficients.

In this particular embodiment, the adder 66 is a simple adder that adds the corresponding correction coefficients that are contained in the state vector $X_{m|m}$ to the position $P_e(k)$, to the orientation $O_e(k)$ and to the velocity $V_e(k)$. Then, the adder 66 delivers the corrected position $P_c(k)$, orientation $O_c(k)$ and velocity $V_c(k)$ obtained thus to the output 37.

Figure 3:
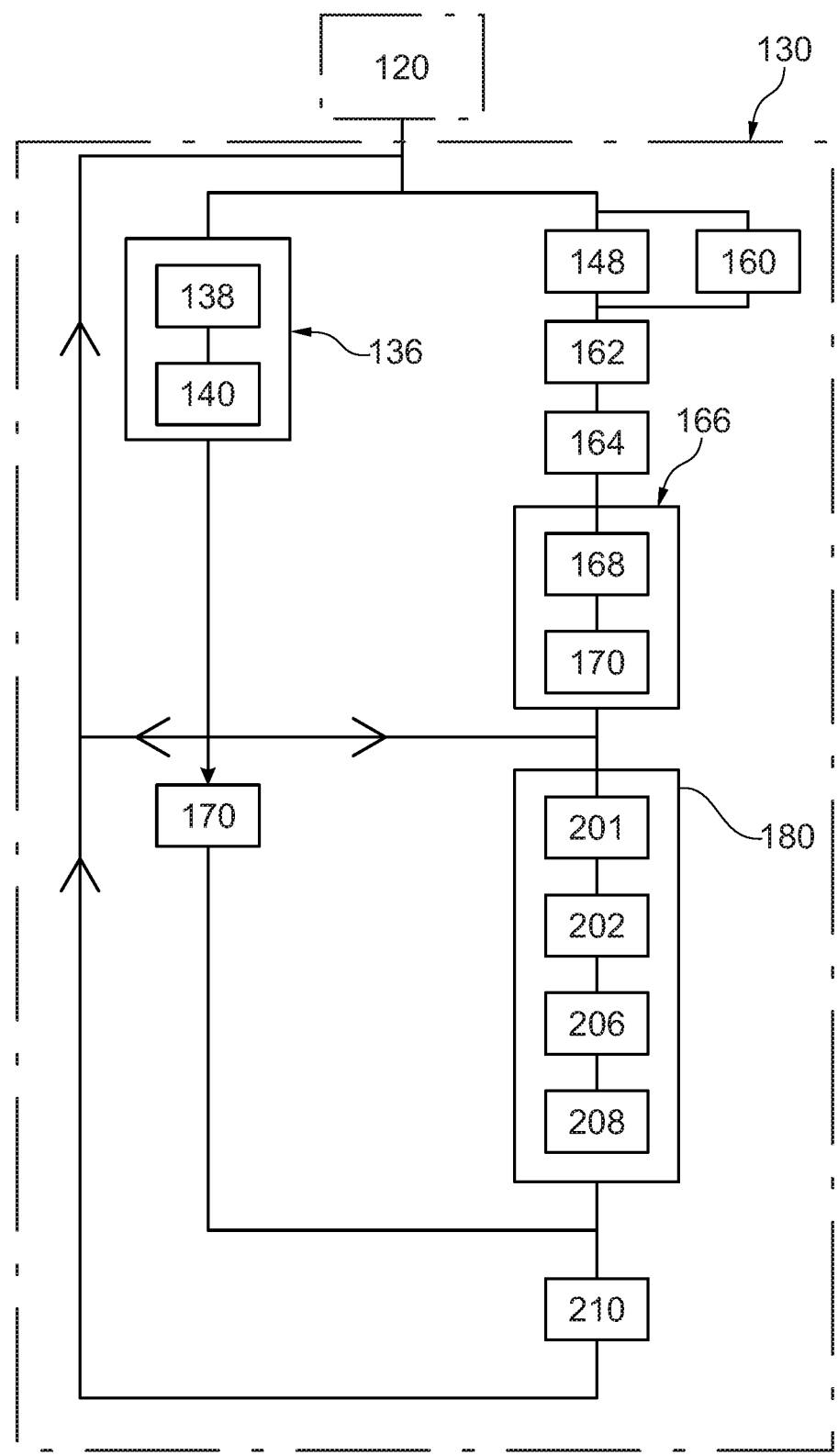
FIG. 3 is a flow chart of a method for locating a vehicle using the system of FIG. 1.

The operation of the system 30 will now be described with reference to the method in FIG. 3 and using the timing chart in FIG. 4.

The use of the system 30 for locating the vehicle 2 starts with a phase 120 of initializing the system 30. This phase 120 starts immediately after the system 30 is activated, i.e., typically immediately after it has been powered up. During this phase 120, the various variables and parameters needed to execute the module 56 are initialized. For example, the initial values of the position, the velocity and the orientation of the vehicle 2 and the correction coefficients are initialized. Numerous algorithms exist for quickly obtaining these initial values.

Once the initialization phase 120 is complete, a phase 130 of executing the module 56 begins.

During a step 136, each time new measurements of the unit 42 are acquired by the computer 50, the module 56 determines and updates the position, the orientation and the velocity of the vehicle 2. Thus, this updating is carried out for each instant $t_k$.

More specifically, step 136 comprises an operation 138, during which the accelerometer 44 and the gyroscope 46 respectively measure the acceleration and the angular velocity of the vehicle 2 and these new measurements are acquired by the computer 50 at the instant $t_k$.

Then, during an operation 140, the sub-module 60 constructs the rough estimates $P_e(k)$, $O_e(k)$ and $V_e(k)$ from:
  the previous position $P(k-1)$, the previous orientation $O(k-1)$ and the previous velocity $V(k-1)$; and
  the measurements of the accelerometer 44 and the gyroscope 46 acquired at the instant $t_k$.

Figure 4:
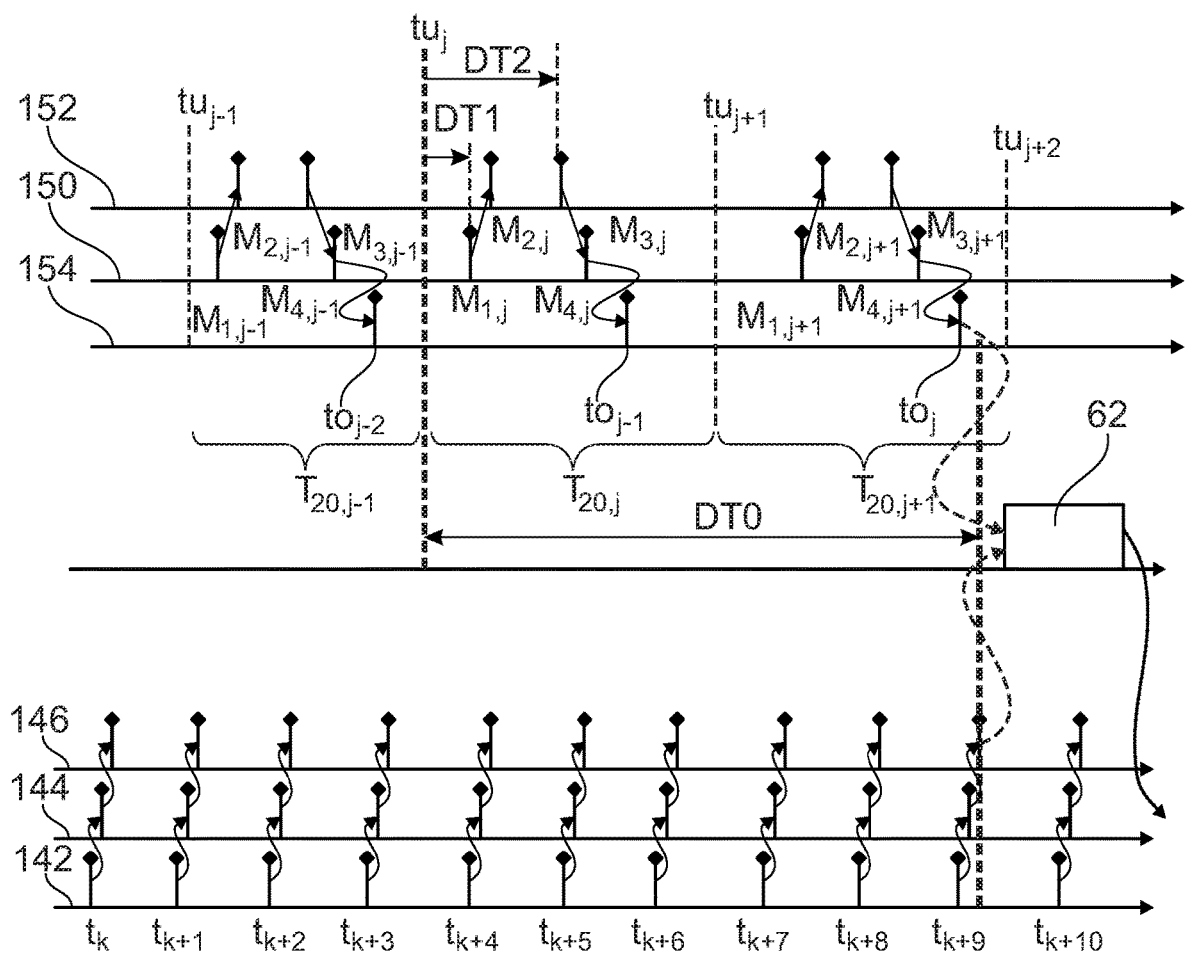
FIG. 4 is a timing chart showing the instants at which different events occur on different time axes.

The lower portion of FIG. 4 comprises a time axis 142, along which the instants $t_k$ to $t_{k+10}$ are shown at which the unit 42 measures the acceleration and the angular velocity. The time axis 144 shows the times at which the sub-module 60 acquires the acceleration and the angular velocity measured by the unit 42. An arrow connects each instant $t_k$ at which a measurement is carried out by the unit 42 to the instant at which the sub-module 60 acquires this measurement. The time axis 146 shows the instants at which the sub-module 60 delivers the estimates $P_e(k)$, $O_e(k)$ and $V_e(k)$. An arrow connects each instant at which a measurement is acquired by the sub-module 60 to the instant at which the sub-module 60 delivers the estimates $P_e(k)$, $O_e(k)$ and $V_e(k)$ obtained from this acquired measurement.

At the same time as step 136, during a step 148, the transceivers 20 and 22 exchange frames of information in order to allow a rough distance to be measured between these transceivers 20, 22 from the transmission and reception instants of these frames of information. Each exchange of frames of information allows enough transmission and reception instants to be acquired to compute a rough distance between these transceivers 20 and 22. In this case, these exchanges are triggered periodically at the frequency $F_{20}$. Each exchange therefore occurs over a respective period $T_{20,j}$ equal to $1/F_{20}$. Each of the periods $T_{20,j}$ starts at a respective instant $tu_j$ of a temporally ordered sequence $\{0, tu_1, tu_2, \ldots, tu_{j-1}, tu_j, \ldots\}$ of the instants $tu_j$. The difference between the instants $tu_j+1$ and $tu_j$ is equal to the duration of the period $T_{20,j}$.

In this embodiment, the method for measuring round-trip distance is implemented. This distance measurement method is better known as "two-way ranging". According to this method, each exchange comprises:

the transceiver 20 transmitting a first frame of information; then
  in response to the transceiver 22 receiving this first frame of information, the transceiver 22 transmitting a second frame of information.

The first frame of information is transmitted at an instant $M_{1,j}$ and is received by the transceiver 22 at an instant $M_{2,j}$. The second frame of information is transmitted at an instant $M_{3,j}$ and is received by the transceiver 20 at an instant $M_{4,j}$. The instant $M_{1,j}$ is not necessarily coincident with the instant $tu_j$. The duration between the instants $tu_j$ and $M_{1,j}$ is referred to herein as the duration DT1. The instant $M_{3,j}$ necessarily occurs after the start of the period $T_{20,j}$. The duration between the instants $tu_j$ and $M_{3,j}$ is referred to herein as the duration DT2. These durations DT1 and DT2 can be computed from the instant $tu_j$ and the measurements of the instants $M_{1,j}$ and $M_{3,j}$.

The instants $M_{1,j}$ and $M_{4,j}$ are measured by the transceiver 20. The instants $M_{2,j}$ and $M_{3,j}$ are measured by the transceiver 22.

In the upper part of FIG. 4, a time axis 150 shows the instants $M_{1,j}$ and $M_{4,j}$ measured by the transceiver 20. A time axis 152 shows the instants $M_{2,j}$ and $M_{3,j}$ measured by the transceiver 22. An arrow connects the transmission and reception instants $M_{1,j}$ and $M_{2,j}$, respectively, of the first frame of information. Another arrow connects the transmission and reception instants $M_{3,j}$ and $M_{4,j}$, respectively, of the second frame of information. The durations DT1 and DT2 are shown in FIG. 4 for the period $T_{20,j}$. Finally, a time axis 154 shows the instants $to_1$ at which the distances $dc_j$ are delivered by the sub-module 61, then acquired by the sub-module 62. In FIG. 4, the periods $T_{20,j-1}$ to $T_{20,j+1}$, as well as the start and end instants $tu_{j-1}$ to $tu_{j+2}$ of each of these periods, are shown.

Since the instant $M_{3,j}$ is measured by the transceiver 22, it cannot be transmitted to the transceiver 20 in the second frame of information transmitted at this instant. In this case, the instants $M_{2,j}$ and $M_{3,j}$ measured by the transceiver 22 are transmitted to the transceiver 20 in the second frame of information transmitted during the next period $T_{20,j+1}$. Accordingly, the instant $to_j$ at which the sub-module 61 delivers the distance dc does not occur in the period $T_{20,j}$, but in the next period $T_{20,j+1}$. A delay of several tens of milliseconds therefore exists between the instants $M_{1,j}$, $M_{2,j}$, $M_{3,j}$ and $M_{4,j}$ used to compute the distance $dc_j$ and the instant at which this distance $dc_j$ is available for processing by the sub-module 62. However, at an instant $t_m$, the sub-module 62 computes the innovation $Y_m$ from the difference between the last acquired distance $dc_m$ and an estimate $\hat{z}_m$ of this distance constructed from the last estimated position $P_e(m)$. Assuming that the instant $t_m$ is equal to the instant $t_{k+9}$ in FIG. 4, then the last distance $dc_m$ is equal to the distance $dc_j$. The last acquired position is the position $P_e(k+9)$. As illustrated in FIG. 4 by dashed arrows that point toward the sub-module 62, this distance $dc_j$ and this position $P_e(k+9)$ are transmitted to the sub-module 62 so that it computes the new state vector $X_{m|m}$ from these measurements. If no correction is made, the innovation $Y_m$ computed by the sub-module 62 is equal to the difference between the measured distance dc and the estimated distance $\hat{z}_{k+9}$. The distance $dc_j$ corresponds to the distance between the transceivers 20, 22 as it was during the period $T_{20,j}$, while the estimated distance $\hat{z}_{k+9}$ corresponds to the distance between the transceivers 20, 22 as it was at the instant $t_{k+9}$, i.e., during the period $T_{20,j+1}$. In other words, the innovation compares a distance as it was during the period $T_{20,j}$ with an estimate of the distance as it is in the next period $T_{20,j+1}$. However, when the vehicle 2 moves quickly, the distance between the transceivers 20, 22 varies by several tens of centimetres between the period $T_{20,j}$ and the period $T_{20,j+1}$. Thus, this introduces an error into the computation of the innovation $Y_m$ that degrades the accuracy of the location of the vehicle. Hereafter, this error is called "measurement delay" since it originates from the fact that the distance measurement occurs over a fairly long duration. As described in detail hereafter, in this method the distance dc is corrected in order to compensate for this measurement delay.

At the same time as step 148, during a step 160, during each period $T_{20,j}$, the sub-module 61 acquires a position $P_j$ and a velocity $V_j$ representing the position and the velocity of the vehicle 2 during this period $T_{20,j}$. This position $P_j$ and this velocity $V_j$ are temporarily stored in order to be used during the next period $T_{20,j+1}$. For example, in this case, at the beginning of each period $T_{20,j}$, the sub-module 61 acquires the position $P_e(k)$ and the velocity $V_e(k)$ delivered by the sub-module 60 at the instant $t_k$ immediately after the instant $tu_j$. This position $P_e(k)$ and this velocity $V_e(k)$ are then stored as a position $P_j$ and a velocity $V_j$, respectively.

When the transceiver 20 has measured the instants $M_{1,j}$ and $M_{4,j}$ and has received the measurements $M_{2,j}$ and $M_{3,j}$, during a step 162, the transceiver 20 transmits these measurements to the sub-module 61.

In response, during a step 164, the sub-module 61 computes a rough distance $db_j$ solely from the transmission and reception instants measured during the period $T_{20,j}$.

In this case, the distance $db_j$ is computed using the following relation (8):

$$db_j = c \cdot \frac{(M_{4,j} - M_{3,j}) + (M_{2,j} - M_{1,j})}{2}$$

where the "c" symbol denotes the speed of light. Hereafter, unless otherwise stated, the "." symbol in a mathematical relation denotes the arithmetic operation of multiplication.

During a step 166, the sub-module 61 corrects the rough distance $db_j$ in order to obtain a corrected distance $dc_j$. In this embodiment, step 166 comprises:

an operation 168 for correcting the movement of the vehicle 2 during the durations DT1 and DT2 in order to obtain a measurement of the distance at the instant $tu_j$, and an operation 170 for correcting the measurement delay.

During operation 168, the sub-module 61 corrects the distance $db_j$ in order to take into account the fact that the vehicle 2 moves between the instants $tu_j$ and $M_{4,j}$ and to thus obtain a more accurate distance $dp_j$ between the transceivers 20, 22 at the instant $tu_j$. To this end, in this embodiment, the movement velocity of the vehicle 2 is considered to be constant over the entire period $T_{20,j}$. Under these conditions, the distance $dp_j$ is computed using the following relation: $dp_j = db_j + \delta d_1$, where $\delta d_1 = -v_{a1} \cdot (DT2 + DT1)/2$, where $v_{a1}$ is the apparent movement velocity of the vehicle 2 towards the transceiver 22. The amplitude of the velocity $v_{a1}$ is equal to the norm of the orthogonal projection of a velocity $v_{j1}$ of the vehicle 2 onto the axis that passes through the geometric centre of the antennae of the transceivers 20, 22. The velocity $v_{j1}$ is a velocity that represents the velocity of the vehicle 2 during the interval [$tu_j$; $M_{4,j}$]. In this case, the velocity $v_{j1}$ is selected as equal to the velocity $v_j$ stored during step 160. The velocity $v_{a1}$ is a number that is positive when the vehicle 2 approaches the transceiver 22 and is negative when it moves away from this transceiver 22.

In this case, the velocity $v_{a1}$ is computed using the following relation: $v_{a1} = -V_j \cdot u_{bv}$, where:

the "." symbol denotes the scalar product operation;

$V_j$ is the velocity stored for the period $T_{20,j}$ during step 160; and $u_{bv}$ is a direction vector that points from the geometric centre of the transceiver antenna 22 toward the geometric centre of the transceiver antenna 20.

The coordinates of this vector up are provided by the following relation:

$$\frac{[x_j - B_x, y_j - B_y, z_j - B_z]}{\|[x_j - B_x, y_j - B_y, z_j - B_z]\|}$$

where:

$x_j$, $y_j$ and $z_j$ are the coordinates of the position $P_j$ of the vehicle stored during the period $T_{20,j}$ during step 160; and $B_x$, $B_y$, $B_z$ are the coordinates of the position of the transceiver 22.

During operation 170, the sub-module 61 corrects the distance $dp_j$ so that it is as close as possible to the distance between the transceivers 20, 22 at the instant $t_m$. Thus, using the example of FIG. 4 again, the sub-module corrects the distance $dp_j$ so that it is close to the distance between the transceivers 20, 22 at the instant $t_{k+9}$. To this end, the sub-module 61 adds a corrective term $\delta d_0$ to the distance $dp_j$ that corresponds to the distance the vehicle 2 has travelled towards the transceiver 22 during the time interval [$tu_j$, $t_j$]. Thus, the corrected distance is computed using the following relation: $dc_j = dp_j - \delta d_0$. The term $\delta d_0$ is computed using the following relation: $\delta d_0 = v_{a0} \cdot DT0$, where:

DT0 is equal to the elapsed time between the instants $tu_j$ and $t_m$;

$v_{a0}$ is an apparent movement velocity of the vehicle 2 towards the transceiver 22.

The velocity $v_{a0}$ is defined as the velocity $v_{a1}$, i.e., its amplitude is equal to the norm of the orthogonal projection of a velocity $V_{j0}$ of the vehicle 2 onto the axis that passes through the geometric centre of the antennae of the transceivers 20, 22. The velocity $V_{j0}$ is a velocity representing the velocity of the vehicle 2 during the interval [$tu_j$; $t_m$]. The velocity $v_{a0}$ is a number that is positive when the vehicle 2 approaches the transceiver 22 and is negative when it moves away from this transceiver 22. In this case, in order to simplify the computations, the velocity $v_{a0}$ is considered to be equal to the velocity $v_{a1}$.

In this case, the duration DT0 is a constant pre-stored in the memory 54 or computed from the instants $tu_j$ and $t_m$. Indeed, in this case, the clocks triggering the instants $t_k$ and $tu_j$ are synchronised. For example, to this end, the system 30 uses the same clock to generate the instants $t_k$ and $tu_j$.

It is this distance $dc_j$ that is acquired by the sub-module 62 at the instant $to_j$.

Then, only if the instant $t_k$ is also an instant $tg_i$ at which a measurement of the unit 40 is acquired, after step 136, the computer 50 executes a step 170 of updating the correction coefficients as a function of the new measurement of the unit 40. During this step 170, the correction coefficients are updated without using the transmission and reception instants obtained by the transceiver 20.

Only if the instant $t_k$ is an instant $to_j$ at which a corrected distance $dc_j$ is acquired, after step 136, the computer 50 executes a step 180 of updating the correction coefficients as a function of the new corrected distance $dc_j$. During this step 180, the correction coefficients are updated without using the measurement of the unit 40.

If the instant $t_k$ corresponds neither to an instant $tg_i$ nor to an instant $to_j$, then the position $P_e(k)$, the orientation $O_e(k)$ and the velocity $V_e(k)$ estimated by the sub-module 60 and not corrected by the sub-module 62 are delivered to the output 37. Thus, at the instants $t_k$ between the instants $t_m$, the position $P_e(k)$, the orientation $O_e(k)$ and the velocity $V_e(k)$ are delivered to the output 37. Furthermore, the method returns to step 136 without executing either step 170 or step 180. In this case, the previous position, the previous orientation and the previous velocity used during the next iteration of step 136 are equal to the position $P_e(k)$, the orientation $O_e(k)$ and the velocity $V_e(k)$, respectively.

During step 180, the sub-module 62 begins by acquiring, during an operation 201, the new corrected distance $dc_j$.

Then, during an operation 202, the block 68 is executed by the computer 50 in order to obtain the predicted state vector $X_{m|m-1}$ from the previous estimate $X_{m-1|m-1}$ of this state vector. The previous estimate $X_{m-1|m-1}$ is the one obtained at the previous instant $t_{m-1}$. The previous instant $t_{m-1}$ corresponds either to an instant $tg_i$ or to the instant $to_{j-1}$. Therefore, the previous estimate $X_{m-1|m-1}$ is the one that was constructed either during the previous execution of step 170 or during the previous execution of step 180.

The prediction $X_{m|m-1}$ of the state vector is constructed by implementing relation (1). In this particular case whereby the filter 64 is an error-state Kalman filter, the prediction $X_{m|m-1}$ is systematically zero.

During operation 202, the block 68 also constructs the prediction $P_{m|m-1}$ of the covariance matrix $P_m$ at the instant $t_m$ by implementing relation (2).

During an operation 206, the block 70 constructs the estimate $\hat{z}_m$ of the distance between the transceivers 20, 22 by implementing the relation (3). In this embodiment, during operation 206, the block 70 also computes the observation matrix $H_m$. The matrix $H_m$ is, for example, computed by deriving the relation (3) relative to each of the various parameters of the state vector $X_{m|m}$.

During the next operation 208, the block 70 updates the correction coefficients. To this end, it corrects the prediction $X_{m|m-1}$ as a function of the difference $Y_m$ between the corrected distance $dc_j$ and its estimate $z_m$. To this end, the block 70 computes the difference $Y_m$ according to relation (4). Then, the gain $K_m$ is computed using relation (5). The corrected state vector $X_{m|m}$ is then obtained by implementing relation (6).

During operation 208, the block 70 also obtains the updated covariance matrix $P_{m|m}$ using relation (7).

On completion of steps 170 and 180, during a step 210, the sub-module 62 corrects the position $P_e(m)$, the orientation $O_e(m)$ and the velocity $V_e(m)$ in order to obtain the corrected position $P_c(m)$, the corrected orientation $O_c(m)$ and the corrected velocity $V_c(m)$.

To this end, the adder 66 adds the correction coefficients contained in the vector $X_{m|m}$ to the corresponding coordinates of the position $P_e(m)$, the orientation $O_e(m)$ and the velocity $V_e(m)$, constructed during the last execution of operation 136, in order to obtain the position $P_c(m)$, the orientation $O_c(m)$ and the velocity $V_c(m)$. Thus, the position $P_c(m)$, the orientation $O_c(m)$ and the velocity $V_c(m)$ are delivered to the output 37 only at the instants $t_m$ and not the position $P_e(m)$, the orientation $O_e(m)$ and the velocity $V_e(m)$. Furthermore, during step 210, the position $P(k)$, the orientation $O(k)$ and the velocity $V(k)$ are transmitted to the sub-module 60 and are used by the sub-module 60 as the previous position, the previous orientation and the previous velocity of the vehicle 2 during the next iteration of step 136.

After step 210, the method returns to step 136.

CHAPTER II: VARIANTS

Variants of Determining Distance:

Other methods for measuring the rough distance $db_j$ from the transmission and reception instants of frames of information between the transceivers 20 and 22 can be implemented. For example, as a variant, the method for measuring the round-trip distance is replaced by a method for measuring distance with two outbound and one return trip, known as "three-way ranging". In this "three-way ranging" method, each exchange of frames of information between the transceivers 20 and 22 comprises, in addition to the transmission of the first and second frames of information, the transceiver 20 transmitting, in response to the reception of the second frame of information, a third frame of information at an instant $M_{5,j}$ and the transceiver 22 receiving this third frame of information at an instant $M_{6,j}$. In this case, the rough distance $db_j$ is computed using the following relation:

$$db_j = c \cdot \frac{1}{2 + \varepsilon^{AB}}\left((M_{3,j} - M_{2,j}) + (1 + \varepsilon^{AB})(M_{4,j} - M_{1,j})\right)$$

where $\varepsilon^{AB}$ is defined by the following relation:

$$\varepsilon^{AB} = \frac{(M_{6,j} - M_{2,j})}{\Delta T} - 1$$

where $\Delta T$ is equal to $M_{5,j} - M_{1,j}$.

As a variant, computing the rough distance $db_j$ takes into account the drift of the clock located in the transceiver 20 relative to the clock located in the transceiver 22. These clocks are used to measure the transmission and reception instants of the frames of information. To this end, for example, the rough distance $db_j$ is computed using the following relation:

$$db_j = c \cdot \frac{(M_{4,j} - M_{1,j}) - (M_{3,j} - M_{2,j})(1 + \varepsilon_{drift,j})}{2}$$

where $\varepsilon_{drift,j}$ is defined by the following relation:

$$\varepsilon_{drift,j} = \frac{\Delta T_{remote,j} - \Delta T_{local,j}}{\Delta T_{remote,j}}$$

where $\Delta T_{remote,j} = M_{2,j} - M_{2,j-1}$ and $\Delta T_{local,j} = M_{1,j} - M_{1,j-1}$.

The measurements of the instants $M_{2,j}$ and $M_{3,j}$ can be transmitted to the transceiver 20 by means other than the second frame of information transmitted during the period $T_{20,j+1}$. For example, these instants $M_{2,j}$ and $M_{3,j}$ are transmitted to the transceiver 20 by means of an additional frame of information, the transmission and reception instants of which are not used for computing the distance $db_j$. For example, this additional frame of information is transmitted at an instant $M_{5,j}$ and is received by the transceiver 20 at an instant $M_{6,j}$. The instants $M_{5,j}$ and $M_{6,j}$ are then typically included between the instants $M_{4,j}$ and $tu_{j+1}$. In this case, the instant $to_j$ is closer to the instant $tu_j$ than in the previous embodiments. For example, the instant $to_j$ is then located towards the end of the period $T_{20,j}$. However, even in this case, a measurement delay exists that is worthwhile correcting. In another embodiment, this additional frame is transmitted by means of an information transmission link established using transceivers independent of the transceivers 20 and 22.

As a variant, the transceivers 20 and 22 are capable of carrying out a rough measurement and a precise measurement of the reception instants. In this case, this possibility can be taken advantage of, for example, in accordance with the following scheme. UWB technology uses an indicator known using the acronym FPI ("First Path Index"). This indicator is constructed by the transceivers 20, 22. This indicator normally must be between high $L_H$ and low $L_B$ limits. When this indicator is between the high $L_H$ and low $L_B$ limits, the precise measurement is used. Conversely, if this indicator is not between the high $L_H$ and low $L_B$ limits, the rough value is used.

The roles of the transceivers 20 and 22 can be reversed. In this case, it is the transceiver 22 that transmits the first frame of information at the instant $M_{1,j}$ and, in response to receiving this first frame of information, the transceiver 20 transmits the second frame of information at the instant $M_{3,j}$. In this embodiment, the instants $M_{2,j}$ and $M_{3,j}$ are measured by the transceiver 20 and the instants $M_{1,j}$ and $M_{4,j}$ are measured by the transceiver 22. The transceiver 22 transmits the measured instants $M_{1,j}$ and $M_{4,j}$ to the transceiver 20, for example, in the first frame of information transmitted at the instant $M_{1,j+1}$.

As a variant, the coordinates $B_x$, $B_y$ and $B_z$ of the position of the fixed transceiver 22 are contained in a frame of information, for example, the second frame of information, transmitted from the transceiver 22 to the transceiver 20. In this case, these coordinates do not need to be previously stored in the memory 54.

Other methods for computing the apparent velocity $v_{a0}$ are possible. For example, as a variant, the velocity $V_{j0}$ used to compute the velocity $v_{a0}$ is equal to the average of the velocities $V_e(k)$ measured by the sub-module 61 during the entire period $T_{20,j}$. To this end, for example, during step 160, the sub-module 61 records each of the velocities $V_e(k)$ throughout the period $T_{20,j}$, then computes an average velocity from these velocities $V_e(k)$. The stored velocity Vj0 is equal to this average velocity. Similarly, the position Pj can be taken as an average of the positions $P_e(k)$ recorded during the period $T_{20,j}$. In another embodiment, the velocity $V_{j0}$ is considered to be equal to the velocity $V_e(k)$ recorded at the instant $t_k$ closest to the middle of the period $T_{20,j}$.

The variants of the previous paragraph can be adapted to the computation of the velocity $v_{a1}$. In this case, the average velocity is preferably computed by taking into account only the velocities $V_e(k)$ recorded during the interval $[tu_j, M_{4,j}]$. Similarly, the average position taken into account for computing the velocity $v_{a1}$ is an average position over the interval $[tu_j, M_{4,j}]$. This example also shows that the apparent velocities $v_{a0}$ and $v_{a1}$ do not need to be identical.

In a simplified embodiment, the operation 168 of correcting the movement of the vehicle 2 during the durations DT1 and DT2 is omitted. This is particularly the case when the durations DT1 and DT2 are very small.

In another embodiment, the corrective term $\delta d_1$ is subtracted from the distance $db_j$ and is not added. In this case, the distance $dp_j$ that is obtained corresponds to the distance between the transceivers 20, 22 at the instant $M_{4,j}$ and not at the instant $tu_j$. Therefore, during operation 170, the duration DT0 is considered to be equal to the duration of the interval $[M_{4,j}; t_m]$. This variant is functionally identical to the description provided in Chapter I, since the sum $\delta d_1 + \delta d_0$ of the corrective terms computed according to this variant is equal to the sum of the corrective terms computed according to the method described in Chapter I.

Variants of the Kalman Filter:

Numerous other embodiments of the filter 64 are possible. For example, the filter 64 can be a linear Kalman filter, an Extended Kalman Filter (EKF), an Unscented Kalman Filter (UKF) or even an adaptive Kalman filter.

Numerous variants of the relations implemented in the Kalman filter exist. Indeed, these relations depend on the coordinate system in which the position, the orientation and the velocity of the vehicle are expressed. However, other coordinate systems can be used instead of the coordinate system $R_T$. For example, the ECI (Earth Centred Inertial) coordinate system can be cited. The ECI coordinate system is not fixed relative to the surface of the earth since the earth rotates in this frame. The coordinate system $R_T$ also can be a coordinate system that is fixed relative to the stars. When another coordinate system is used, it is possible, simply by changing the coordinate system, to return to the situation described herein.

The Kalman filter relations can also contain an additional rotation matrix for taking into account the fact that the measurement axes of the unit 42 are not aligned on the axes of the coordinate system $R_b$.

Similarly, numerous variants of the state vector $X_{m|m}$ are possible. For example, the state vector $X_{m|m}$ also may not comprise a correction coefficient for the biases of the accelerometer 44 and of the gyroscope 46. The state vector $X_{m|m}$ can also comprise additional state variables.

In another embodiment, the corrected distance is added to the state vector of the Kalman filter and the state and observation matrices are modified accordingly. However, such an embodiment then requires executing the Kalman filter at each instant $t_k$, which is not always desirable.

The previous teaching for the particular case whereby the correction sub-module 62 uses one or more Kalman filter(s) also applies to correction sub-modules that construct the correction coefficients using estimators other than Kalman filters. In general, the description provided herein applies to any correction sub-module configured to update the correction coefficients using a difference between:
- a measurement of a physical quantity constructed from the corrected distance $dc_j$; and
- an estimate of this physical quantity constructed from measurements of the unit 42 or of another sensor separate from the transceiver 20.

Other embodiments of the sub-module 62 are possible. For example, as a variant, the sub-module 62 is arranged as described in the architecture known as "tight coupling". This architecture is described in more detail in chapter 4.1.2 of the Godha2006 thesis.

Variants of the Method:

The position of the vehicle 2 can be determined from measurements of one or more measurement unit(s) other than the inertial measurement unit 42. For example, these measurement units are selected from the group made up of:
- the satellite geolocation unit 40;
- the inertial measurement unit 42;
- an odometer;
- a magnetometer associated with a map of the magnetic fields of the earth.

For example, in one embodiment, the unit 42 is replaced by the satellite geolocation unit 40. The position $P_e(k)$ and the velocity $V_e(k)$ are then the measurements of the position and of the velocity of the vehicle 2 delivered by this unit 40 at the instants $tg_i$. In such an embodiment, the correction sub-module 62 corrects the position $P_e(k)$ and the velocity $V_e(k)$ solely from the distance $dc_j$ delivered by the sub-module 61. The duration DT0 is then considered to be equal to the duration of the interval between the instant $tu_j$ and the last instant $tg_i$ at which the unit 40 delivered an estimate of the position and of the velocity of the vehicle. In another embodiment, a combination of several sensors delivers, at each instant $t_k$, the position $P_e(k)$ and the velocity $V_e(k)$. For example, this combination of sensors comprises an odometer that allows the velocity of the vehicle 2 to be estimated and a triaxial magnetometer that allows the orientation of the vehicle 2 to be estimated. It is also possible to deliver a position $P_e(k)$ and a velocity $P_e(k)$ from these two sensors. Other combinations of sensors are possible. Thus, the description that has been provided also can be implemented in a location system in which the units 40 and 42 are replaced by one or more other sensor(s) from which the position and the velocity of the vehicle 2 can be determined.

As a variant, the system 30 is equipped with additional sensors, such as, for example, a magnetometer, a barometer, an altimeter or an odometer. In this case, the correction sub-module 62 is modified in order to take into account the measurements of these additional sensors for correcting the rough estimates delivered by the integration sub-module 60.

In another embodiment, the satellite geolocation unit 40 is omitted. In this case, for example, the correction coefficients are only updated from the corrected distances $dc_j$.

If the movement of the vehicle 2 is limited, then certain measurements along certain measurement axes may be omitted. For example, if the vehicle 2 is limited to moving in a horizontal plane, the measurements along the $Z_T$ axis can be omitted.

Variants of the Locating System:

As a variant, the transceivers 20, 22 are not UWB transceivers. For example, the transceivers 20, 22 are replaced by radio transceivers that use a much narrower frequency spectrum for exchanging frames of information.

As a variant, the system for locating the vehicle 2 comprises a single fixed transceiver or, alternatively, several fixed transceivers. In the case whereby the system comprises several fixed transceivers, these are preferably distributed at regular intervals along the path or along a portion of this path. In this latter case, if the mobile transceiver 20 can simultaneously communicate with several fixed transceivers, then, instead of providing a single corrected distance at an instant $to_1$, the sub-module 61 simultaneously provides several corrected distances, with each of these distances corresponding to a distance between the transceiver 20 and a respective fixed transceiver. Subsequently, the sub-module 62 corrects the estimate of the position by taking into account these different distances and the known positions of the various fixed transceivers. In this case, advantageously, the first frame of information transmitted by the transceiver 20 is common to all the fixed transceivers.

As a variant, the electronic computer 50 is not housed inside the vehicle 2 but elsewhere. For example, the electronic computer 50 is housed inside a fixed terminal that already contains the transceiver 22.

Temporal synchronisation between the instants $tu_j$ and $t_k$ can be obtained by other means. For example, as a variant, a common trigger signal is sent to the transceiver 20 and to the unit 42 in order to trigger the completion of the measurements at the same time.

Other Variants:

The vehicle 2 is not necessarily a motor vehicle. The description that has been provided applies to any vehicle capable of moving along a path equipped with fixed transceivers. For example, the vehicle 2 also can be a railway vehicle or a boat.

As a variant, the vehicle 2 does not comprise propulsion means 34 on board the vehicle 2. This is the case, for example, when the vehicle 2 is a cable-car towed by a cable.

Similarly, the cockpit 38 can be remote and located outside the vehicle 2. This is the case when the vehicle 2 is a remotely controlled vehicle or a cable-car.

In a simplified embodiment, the system 30 does not deliver the position or the velocity or the orientation of the vehicle 2 to the output 37. For example, in a highly simplified embodiment, only the distance $dc_j$ that separates the vehicle 2 from the transceiver 22 is delivered to the output 37. However, even in such a simplified embodiment, the position and the velocity of the vehicle 2 are determined in order to make the various corrections described above.

CHAPTER III: ADVANTAGES OF THE DESCRIBED EMBODIMENTS

Adding the corrective term $\delta d_0$ to the rough distance $db_1$ allows a corrected distance $dc_j$ to be obtained that takes into account the fact that the vehicle 2 has moved between the instants $tu_j$ and $t_m$. Thus, the distance $dc_j$ reduces the amplitude of the measurement delay. The computed innovation $Y_m$ is then more accurate, which allows more precise location of the vehicle to be obtained.

Adding the corrective term $\delta d_1$ to the rough distance $db_j$ allows a corrected distance $dc_j$ to be obtained that also compensates for the fact that the vehicle 2 has moved between the instants $tu_j$ and $M_{4,j}$. This allows more precise location of the vehicle to be obtained.

The use of UWB transceivers allows more precise location of the vehicle 2 to be obtained.

The invention claimed is:

1. A method for locating a vehicle, said method comprising:
   (a) triggering, at an instant $tu_j$, an exchange of radio signals between a mobile transceiver fixed to the vehicle and a fixed transceiver located along a path of the vehicle;
   (b) once said exchange of radio signals is complete, computing, by an electronic computer, a rough distance only from the transmission or reception instants of the radio signals exchanged during said exchange; and
   (c) locating, by the electronic computer, the vehicle, said locating comprising:
   constructing an estimated position of the vehicle at an instant $t_m$ from a measurement performed using a measurement unit independent and separate from the fixed and mobile transceivers and without using the computed rough distance, with the instant $t_m$ being subsequent to the instant $tu_j$; and
   correcting the estimated position of the vehicle as a function of a difference between: a first distance between the fixed and mobile transceivers computed from the transmission or reception instants of the radio signals exchanged during the exchange triggered at the instant $tu_j$; and a second distance between the estimated position of the vehicle at the instant $t_m$ and a position of the fixed transceiver,
   wherein the method further comprises correcting the rough distance computed during step (b) in order to obtain a corrected distance, and during the step (c), as the first distance to correct the estimated position of the vehicle, and said step of correcting the rough distance comprises:
computing an apparent movement velocity of the vehicle towards the fixed transceiver, with an amplitude of said apparent velocity being equal to a norm of an orthogonal projection of a velocity of the vehicle between the instants $tu_j$ and $t_m$ onto an axis that passes through a geometric center of antennae of the mobile and fixed transceivers; and
adding a first corrective term $\delta d_0$ to the computed rough distance, wherein the first corrective term is computed using a relation: $\delta d_0 = V_{a0} \cdot DT0$, wherein DT0 is equal to an elapsed time between the instants $tu_j$ and $t_m$; $v_{a0}$ is the computed apparent velocity; and the "·" symbol denotes arithmetic multiplication.

2. The method according to claim 1, wherein:
the exchange of radio signals, triggered at the instant $tu_j$, starts with a transmission of a first frame of information and ends with a transmission of a last frame of information, transmission and reception instants of which are measured and then used during step (b) to compute the rough distance;
the step of correcting the rough distance further comprises adding a second corrective term $\delta d_1$ to the computed rough distance, wherein the second corrective term is computed using a relation: $\delta d_1 = -v_{a1} \cdot (DT2+DT1)/2$, where:
$v_{a1}$ is the apparent movement velocity of the vehicle towards the fixed transceiver, with the amplitude of said apparent velocity $V_{a1}$ being equal to the norm of the orthogonal projection of the velocity of the vehicle between the instants $tu_j$ and $t_m$ onto the axis that passes through the geometric center of the antennae of the mobile and fixed transceivers;
DT1 is equal to the elapsed time between the instant $tu_j$ and the transmission instant of the first frame of information; and
DT2 is equal to the elapsed time between the instant $tu_j$ and the transmission instant of the last frame of information.

3. The method according to claim 1, wherein the radio signals are ultra-wide band signals.

4. The method according to claim 1, wherein:
the step (a) is repeated at each instant $tu_j$ of a temporally ordered sequence of instants $\{0, t_1, t_2, \ldots, tu_{j-1}, tu_j, \ldots\}$, with each repetition of the step (a) being followed by a repetition of the step (b); and
the construction of the estimated position is repeated for each instant $t_k$ of a temporally ordered sequence of instants $\{0, t_1, t_2 \ldots, t_{k-1}, t_k, \ldots\}$, with a frequency of the instants $t_k$ being higher than a frequency of the instants $tu_j$, such that several instants ty are interposed between immediately consecutive instants $tu_j$ and $tu_{j-1}$, with the instant $t_m$ being an instant of said sequence of instants $\{0, t_1, t_2, \ldots, t_{k-1}, t_k, \ldots\}$ that immediately precedes the execution of the correction of the estimated position of the vehicle.

5. The method according to claim 1, wherein constructing the estimated position of the vehicle comprises:
acquiring, by the electronic computer, a measurement of an acceleration and a measurement of an angular velocity of the vehicle at the instant $t_m$ that is performed by an inertial navigation unit; and
constructing, by an inertial measurement integration module, the estimated position of the vehicle from a previous position of the vehicle and the measurements of the acceleration and the angular velocity acquired at the instant $t_m$.

6. A non-transitory information storage medium, storing instructions, executable by an electronic computer, for executing the method for locating the vehicle according to claim 1, when the instructions are executed by said electronic computer.

7. A system for locating a vehicle, said system comprising:
a mobile transceiver fixed to the vehicle and configured to exchange radio signals with a fixed transceiver located along a path of the vehicle; and
an electronic computer configured to execute the following steps:
(a) triggering, at an instant $tu_j$, an exchange of radio signals between the mobile transceiver fixed to the vehicle and the fixed transceiver located along a path of the vehicle;
(b) once said exchange of radio signals is complete, computing a rough distance only from the transmission or reception instants of the radio signals exchanged during said exchange; and
(c) locating the vehicle, said locating comprising:
constructing an estimated position of the vehicle at an instant $t_m$ from a measurement performed using a measurement unit independent and separate from the fixed and mobile transceivers and without using the computed rough distance, with the instant $t_m$ being subsequent to the instant $tu_j$; and
correcting the estimated position of the vehicle as a function of a difference between: a first distance between the fixed and mobile transceivers computed from the transmission or reception instants of the radio signals exchanged during the exchange triggered at the instant $tu_j$; and a second distance between the estimated position of the vehicle at the instant $t_m$ and a position of the fixed transceiver,
wherein the electronic computer is further configured to correct the rough distance computed during step (b) in order to obtain a corrected distance, and, during the step (c), as the first distance to correct the estimated position of the vehicle, and said step of correcting the rough distance comprises:
computing an apparent movement velocity of the vehicle towards the fixed transceiver, with an amplitude of said apparent velocity being equal to a norm of an orthogonal projection of a velocity of the vehicle between the instants $tu_j$ and $t_m$ onto an axis that passes through a geometric center of antennae of the mobile and fixed transceivers; and
adding a first corrective term $\delta d_0$ to the computed rough distance, wherein the first corrective term is computed using a relation: $\delta d_0 = v_{a0} \cdot DT0$, wherein: DT0 is equal to an elapsed time between the instants $tu_j$ and $t_m$; $v_{a0}$ is the computed apparent velocity; and the "·" symbol denotes arithmetic multiplication.

\* \* \* \* \*